US007729305B2

(12) United States Patent
Cho et al.

(10) Patent No.: US 7,729,305 B2
(45) Date of Patent: Jun. 1, 2010

(54) SYSTEM AND METHOD FOR PROVIDING SERVICES USING THE SAME FREQUENCY IN A WIRELESS COMMUNICATION SYSTEM

(75) Inventors: Jae-Hee Cho, Seoul (KR); Bong-Gee Song, Seongnam-si (KR); Soon-Young Yoon, Seoul (KR); Jae-Hwan Chang, Suwon-si (KR); In-Seok Hwang, Seoul (KR); Eun-Sun Choi, Gwacheon-si (KR); Hoon Huh, Seongnam-si (KR); Sung-Joon Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1064 days.

(21) Appl. No.: 11/324,714

(22) Filed: Jan. 3, 2006

(65) Prior Publication Data

US 2006/0148408 A1 Jul. 6, 2006

(30) Foreign Application Priority Data

Jan. 3, 2005 (KR) ...................... 10-2005-0000296

(51) Int. Cl.
*H04W 4/00* (2009.01)
(52) U.S. Cl. .................. 370/328; 370/310; 370/312; 370/329; 370/341; 455/526; 455/450; 455/454; 455/447
(58) Field of Classification Search ............... 370/328, 370/329, 310, 312, 341; 455/526, 450, 454, 455/447
See application file for complete search history.

(56) References Cited

U.S. PATENT DOCUMENTS

| 6,968,017 | B2* | 11/2005 | Nielsen | 375/316 |
|---|---|---|---|---|
| 2004/0224691 | A1* | 11/2004 | Hadad | 455/442 |
| 2005/0002323 | A1* | 1/2005 | Hadad | 370/203 |
| 2006/0039328 | A1* | 2/2006 | Ihm et al. | 370/334 |
| 2008/0039107 | A1* | 2/2008 | Ma et al. | 455/450 |

(Continued)

FOREIGN PATENT DOCUMENTS

WO WO 2004/100577 11/2004

OTHER PUBLICATIONS

IEEE Std 802.16-2004, "Data communication in a wireless communication system using space-time coding", Oct. 1, 2004, IEEE, all pages (available from http://standards.ieee.org/getieee802/download/802.16-2004.pdf).*

(Continued)

*Primary Examiner*—Rafael Pérez-Gutiérrez
*Assistant Examiner*—Allahyar Kasraian
(74) *Attorney, Agent, or Firm*—The Farrell Law Firm, LLP (57) ABSTRACT

A method for providing a single-frequency network (SFN) service between a base station (BS) and a mobile station (MS) in a wireless communication system. The BS sets a first segment indicator in a medium access control (MAC) message field before transmission, if a resource allocation scheme corresponds to general data transmission. The BS sets a second segment indicator in the MAC message before transmission, if the resource allocation scheme corresponds to single frequency-based data transmission. The MS receives the MAC message from the BS, and performs renumbering according to the first segment indicator or the second segment indicator included in the received MAC message.

13 Claims, 8 Drawing Sheets

U.S. PATENT DOCUMENTS

| | | | | |
|---|---|---|---|---|
| 2008/0101334 A1* | 5/2008 | Bakker et al. | ............... | 370/350 |
| 2008/0170490 A1* | 7/2008 | Connors et al. | ............. | 370/203 |
| 2008/0170529 A1* | 7/2008 | Connors et al. | ............. | 370/312 |
| 2008/0170530 A1* | 7/2008 | Connors et al. | ............. | 370/312 |
| 2008/0170531 A1* | 7/2008 | Petry et al. | .................. | 370/312 |
| 2008/0192748 A1* | 8/2008 | Kim et al. | ................... | 370/394 |
| 2008/0200171 A1* | 8/2008 | Jeong et al. | ................. | 455/436 |
| 2008/0233966 A1* | 9/2008 | Scheim et al. | ........... | 455/452.1 |
| 2009/0092037 A1* | 4/2009 | Hadad | ........................ | 370/207 |
| 2009/0129334 A1* | 5/2009 | Ma et al. | .................... | 370/331 |
| 2009/0252070 A1* | 10/2009 | Connors et al. | ............. | 370/311 |

OTHER PUBLICATIONS

IEEE , Enhancements with MIMO Midambles for Cellular OFDMA Systems, Jun. 27, 2004, IEEE, all pages.*

P802.16-2004/Cor1/D5, 2005 (Draft IEEE Standard for Local and metropolitan area networks), "Corrigendum to IEEE Standard for Local and Metropolitan Area Networks—Part 16: Air Interface for Fixed Broadband Wireless Access Systems", Sep. 12, 2005, All Pages.*

Yaghoobi, Scalable OFDMA Physical Layer in IEEE 802.16 WirelessMAN, Intel Technology Journal, vol. 8, Issue 3, Aug. 20, 2004.

Kwon et al., Preamble Structure for Single Frequency Cellular Systems Using Orthogonal Frequency Division Multiplexing, IEEE Transactions on Consumer Electronics, Feb. 2004.

Yigal Leiba et al., Clarifications to Permutations Based on IDCell Parameter, IEEE C802.16maint-04/72, Nov. 10, 2004.

IEEE Std 802.16-2004, Part 16: Air Interface for Fixed Broadband Wireless Access Systems, Sep. 2000.

Part 16: Air Interface for Fixed Broadband Wireless Access Systems, IEEE Std 802.16-2004, Oct. 1, 2004.

* cited by examiner

SYSTEM AND METHOD FOR PROVIDING SERVICES USING THE SAME FREQUENCY IN A WIRELESS COMMUNICATION SYSTEM

PRIORITY

This application claims the benefit under 35 U.S.C. §119 of an application entitled "System And Method For Providing Single Frequency-Based Service In A Wireless Communication System" filed in the Korean Intellectual Property Office on Jan. 3, 2005 and assigned Serial No. 2005-296, the contents of which are incorporated herein by reference.

BACKGROUND OF THE INVENTION

1. Field of the Invention

The present invention relates generally to a Broadband Wireless Access (BWA) communication system, and in particular, to an apparatus and method for providing services in an Orthogonal Frequency Division Multiple Access (OFDMA) communication system.

2. Description of the Related Art

Research on the $4^{th}$ generation (4G) communication system, which is the next generation communication system, is being conducted to provide users with various qualities-of-service (QoS) at a data rate of about 100 Mbps. Currently, therefore, active research on the 4G communication system is being conducted to develop a new communication system that guarantees mobility and QoS for a wireless Local Area Network (LAN) system and a wireless (Metropolitan Area Network) MAN system, thereby to support a high data rate, guaranteed by both systems.

A system employing an Orthogonal Frequency Division Multiplexing (OFDM) scheme and an Orthogonal Frequency Division Multiple Access (OFDMA) scheme to support a broadband transmission network for physical channels of the wireless MAN communication system is defined as an Institute of Electrical and Electronics Engineers (IEEE) 802.16a communication system. The IEEE 802.16a communication system, because it applies the OFDM/OFDMA scheme to the wireless MAN system, can support high-speed data transmission by transmitting physical channel signals using a plurality of subcarriers. That is, the IEEE 802.16a communication system is one of the typical communication systems using the OFDM/OFDMA scheme (hereinafter referred to as "OFDM/OFDMA communication systems").

The current IEEE 802.16a communication system takes into account only the single-cell configuration in which mobility of subscriber stations (SSs) is never taken into consideration. However, an IEEE 802.16e communication system is specified as a system that takes into account the mobility of SSs in the IEEE 802.16a communication system. Therefore, the IEEE 802.16e communication system must take into account the mobility of SSs in a multicell environment.

In order to support the mobility of SSs in the multicell environment, there is a need to modify operations of the SS and a base station (BS). In particular, active research is being performed on handover of the SSs for a multicell configuration to support the mobility of SSs. Herein, an SS with the mobility will be referred to as a mobile station (MS).

Figure 1:
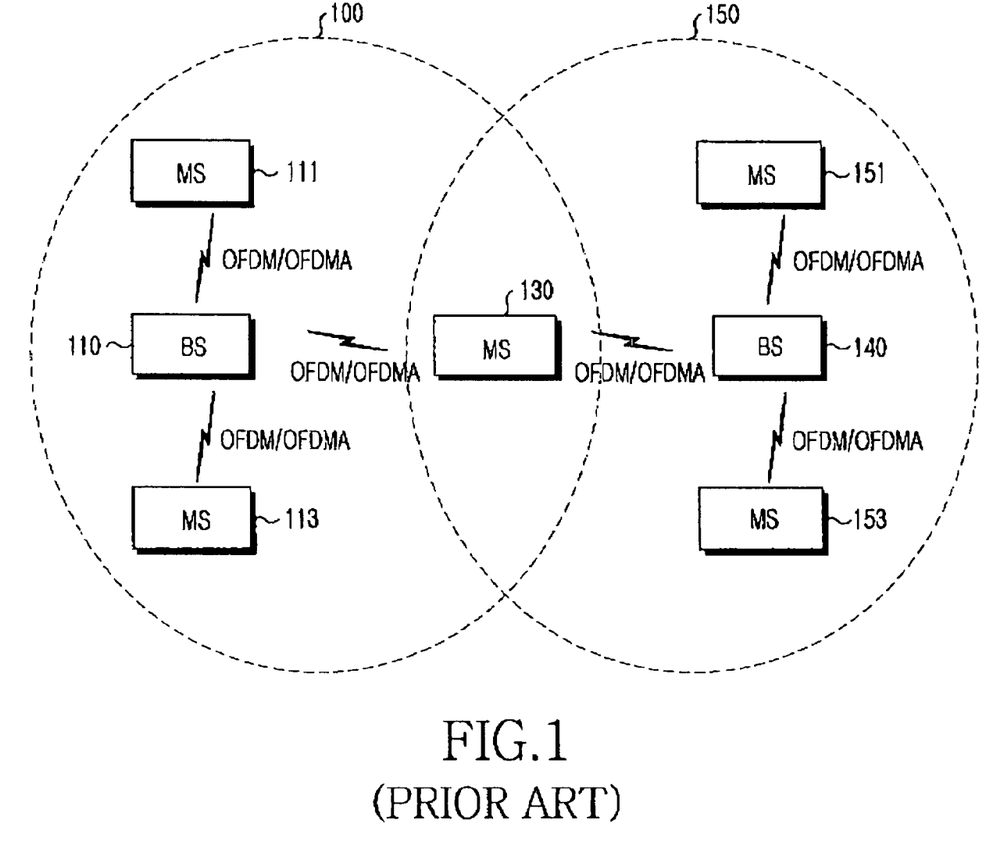
FIG. 1 is a diagram schematically illustrating a configuration of a conventional BWA communication system.

FIG. 1 is a diagram schematically illustrating a configuration of a conventional BWA communication system. The BWA communication system has a multicell configuration, i.e., has a cell 100 and a cell 150. The BWA communication system includes a BS 110 for managing the cell 100, a BS 140 for managing the cell 150, and a plurality of MSs 111, 113, 130, 151 and 153. Signal exchange between the BSs 110 and 140 and the MSs 111, 113, 130, 151 and 153 is achieved using the OFDM/OFDMA scheme.

Figure 2:
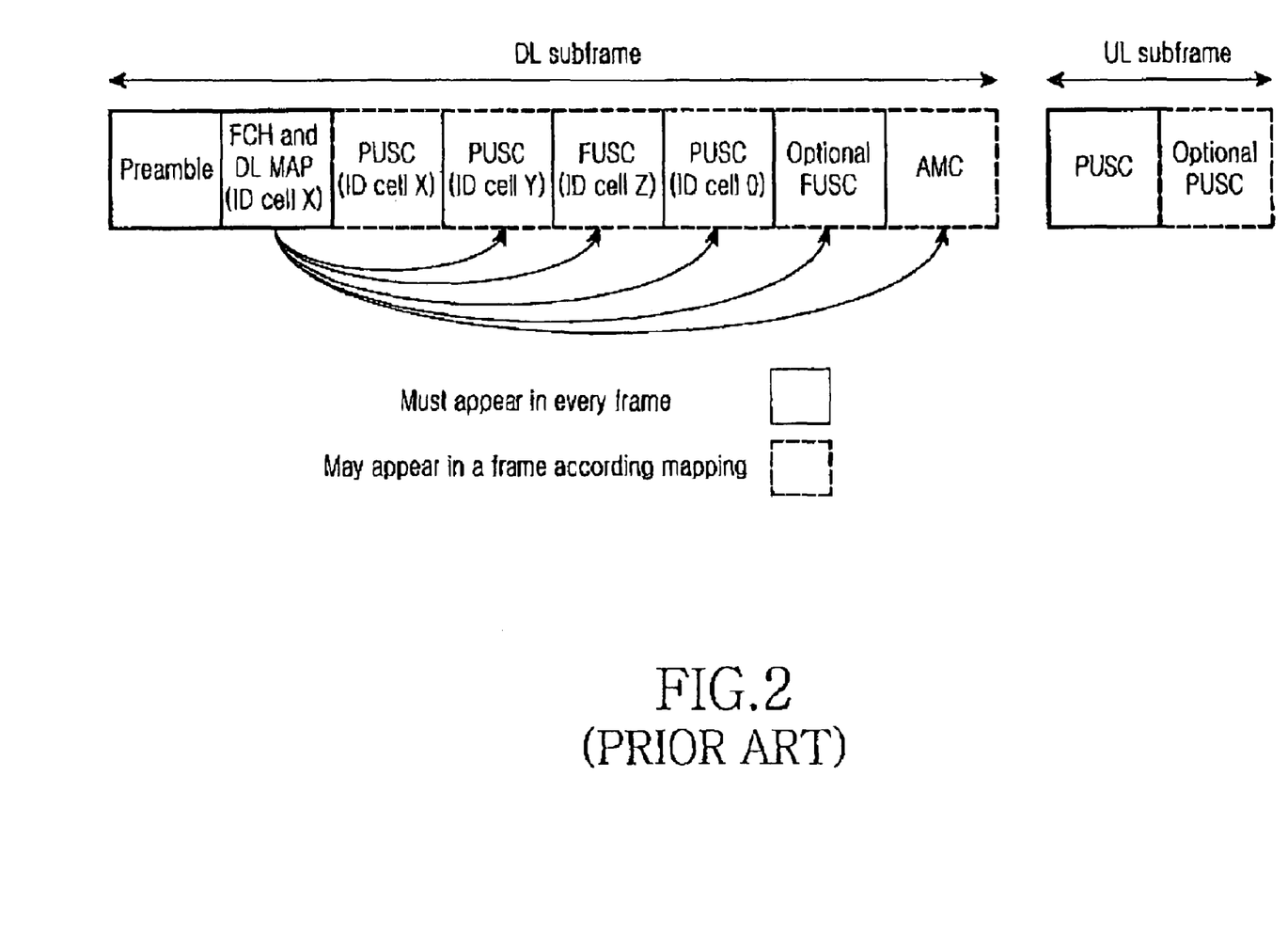
FIG. 2 is a diagram schematically illustrating a frame format divided into a plurality of zones in a conventional BWA communication system.

The OFDMA scheme proposed in the BWA communication system creates a subchannel from subcarriers constituting one OFDM symbol, and several OFDM symbols constitute one frame. A format of a frame divided into a plurality of zones in the OFDMA system will now be described with reference to FIG. 2. FIG. 2 is a diagram schematically illustrating a format of an uplink/downlink frame divided into a plurality of zones in a conventional OFDMA communication system.

Referring to FIG. 2, a frame format of the OFDMA communication system includes a downlink (DL) subframe and an uplink (UL) subframe. The downlink frame can include a plurality of zones, such as Preamble, Partial Usage of Subchannels (PUSC), Full Usage of the Subchannels (FUSC), and Adaptive Modulation and Coding (AMC) zones. The PUSC zone, a first-allocated zone of the downlink frame, includes frame allocation information such as a Frame Control Header (FCH) and a DL-MAP, and a change in the subsequent zones can be made using a Space Time Coding (STC) zone Information Element (IE) (STC_ZONE_IE) message of a DL-MAP zone including information on the downlink frame.

The DL-MAP zone, a zone where a DL-MAP message is transmitted, has IEs included in the DL-MAP message. For example, the DL-MAP message includes the STC_ZONE_IE message.

That is, as illustrated in FIG. 2, several resource allocation schemes can exist in one frame, and a change in the zones following the first PUSC zone is made using the STC_ZONE_IE message in the DL-MAP.

A format of the STC_ZONE_IE message is shown in Table 1 below.

TABLE 1

| Syntax | Size | Notes |
|---|---|---|
| STC_ZONE_IE0 { | | |
| Extended DIUC | 4 bits | STC/ZONE_SWITCH=0x01 |
| Length | 4 bits | Length=0x04 |
| OFDMA symbol offset | 8 bits | Denotes the start of the zone (counting from the frame preamble and starting from 0) |
| Permutation | 2 bits | 0b00=PUSC permutation<br>0b01=FUSC permutation<br>0b10=Optional FUSC permutation<br>0b11=Adjacent subcarrier permutation |
| Use All SC Indicator | 1 bits | 0=Do not use all subchannels<br>1=Use all subchannels |
| STC | 2 bits | 0b00=No STC<br>0b01=STC using 2 antennas<br>0b10=STC using 4 antennas<br>0b11=FHDC using 2 antennas |
| Matrix Indicator | 2 bits | Antenna STC/FHDC matrix (see 8.4.8)<br>0b00=Matrix A<br>0b01=Matrix B<br>0b10=Matrix C (applicable to 4 antennas only)<br>0b11=Reserved |
| DL_PermBase | 5 bits | |
| AMC type | 2 bits | Indicates the AMC type in case permutation type = 0b11, otherwise shall be set to 0<br>AMC type (NxM=N bins by M symbols):<br>0b00 1x6<br>0b01 2x3<br>0b10 3x2<br>0b11 reserved |
| reserved | 8 bits | Shall be set to zero |
| } | | |

Table 1 shows a format of a conventional STC_ZONE_IE message. As shown in Table 1, a Permutation field defines a zone to be allocated after the STC_ZONE_IE. A DL_Perm- Base field is used for subchannel allocation for each zone. A Use All SC indicator field indicates whether all subchannels are used in a PUSC zone, and this field is disregarded in other allocated zones.

In the STC_ZONE_IE message defining a transmit diversity mode, an STC field indicates a diversity mode based on the number of antennas, and a Matrix Indicator field indicates a type of a matrix encoded using the transmit diversity. Finally, an AMC type field indicates a resource allocation type for an allocated AMC zone (Permutation=0b11).

The PUSC subchannel generation process described above is defined in the 802.16 standard, thus a detailed description thereof will not be given herein for simplicity purpose. Generally, the process defined in the standard generates N subchannels per 2 OFDMA symbols. The generated subchannels have their own unique physical numbers of 0 through N−1.

The 802.16 standard applies a so-called segmentation technique to the PUSC. That is, the standard assigns a unique segment number to each cell or sector, and the cell or sector allocated the segment number exclusively uses only a part of the generated full PUSC subchannel. In other words, a start point of an allocated subchannel is determined according to the segment number.

The number of the allocated subchannels is determined depending on the FCH. In the current standard, a segment number indicating a start point of a subchannel is determined depending on a segment number of a preamble. That is, if a preamble is detected for acquisition of synchronization between MSs, a segment number to be used in a frame where the preamble is transmitted is automatically acquired. The current standard defines three values of 0, 1 and 2 as preamble segment numbers. In the following description, the segment number will be referred to as a "segment indicator."

In summary, allocation of PUSC subchannels is achieved by generating the PUSC subchannels, applying the segmentation technique to the generated PUSC subchannels, and subsequently, applying a renumbering technique to the segmented PUSC subchannels. An exemplary method of applying the renumbering technique to the PUSC subchannels will now be described with reference to FIG. 3.

Figure 3:
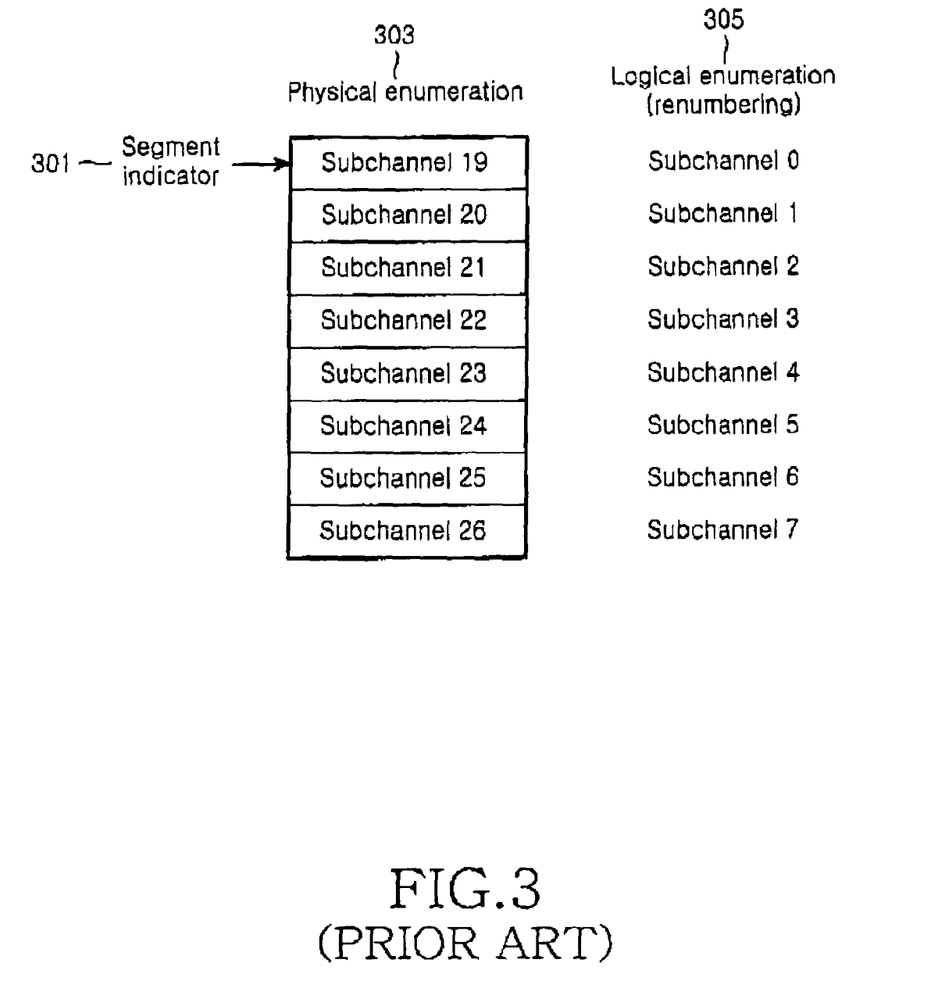
FIG. 3 is a diagram illustrating a renumbering method for a PUSC zone in a BWA communication system according to the prior art.

FIG. 3 is a diagram illustrating a renumbering method for a PUSC zone in an OFDMA communication system according to the prior art. Numbers of logical subchannels (logical enumeration (renumbering)) 305 obtained by re-defining numbers of physical subchannels (physical enumeration) 303 are acquired from a segment indicator 301 obtained through the preamble. The acquired logical subchannel numbers 305 have subchannel numbers beginning from 0 regardless of the segment indicator.

The resource allocation scheme in the OFDMA communication system has been described so far. Next, a single-frequency network (SFN) service will be briefly described. In a general multi-frequency network (MFN), repeaters are installed in every service area to provide services transmit signals by channel switching. The MFN requires many frequencies to provide a broadcast service. Research has been conducted on technology for enabling neighboring service areas to use the same transmission frequency using a characteristic that the OFDM system is robust against multipath channels. This scheme is called a single-frequency network (SFN). The SFN allows neighboring BSs to transmit the same data over the same subchannel thereby to acquire a transmit diversity effect, thus guaranteeing high reception performance.

The SFN service in the OFDMA communication system can be achieved through a zone defined by the STC_ZONE_IE message described with reference to Table 1, after the first PUSC zone. This is because the first PUSC zone includes FCH and DL/UL-MAP indicating the frame allocation information.

If it is assumed that a resource allocation scheme defined by the STC_ZONE_IE message is specified as a PUSC scheme, an MS performs renumbering. However, an MS mapped to its associated segment decodes the subchannels allocated such that they are logically identical to each other but physically different from each other. In this case, therefore, the MS cannot receive the SFN service. This will be described below with reference to the accompanying drawing.

Figure 4:
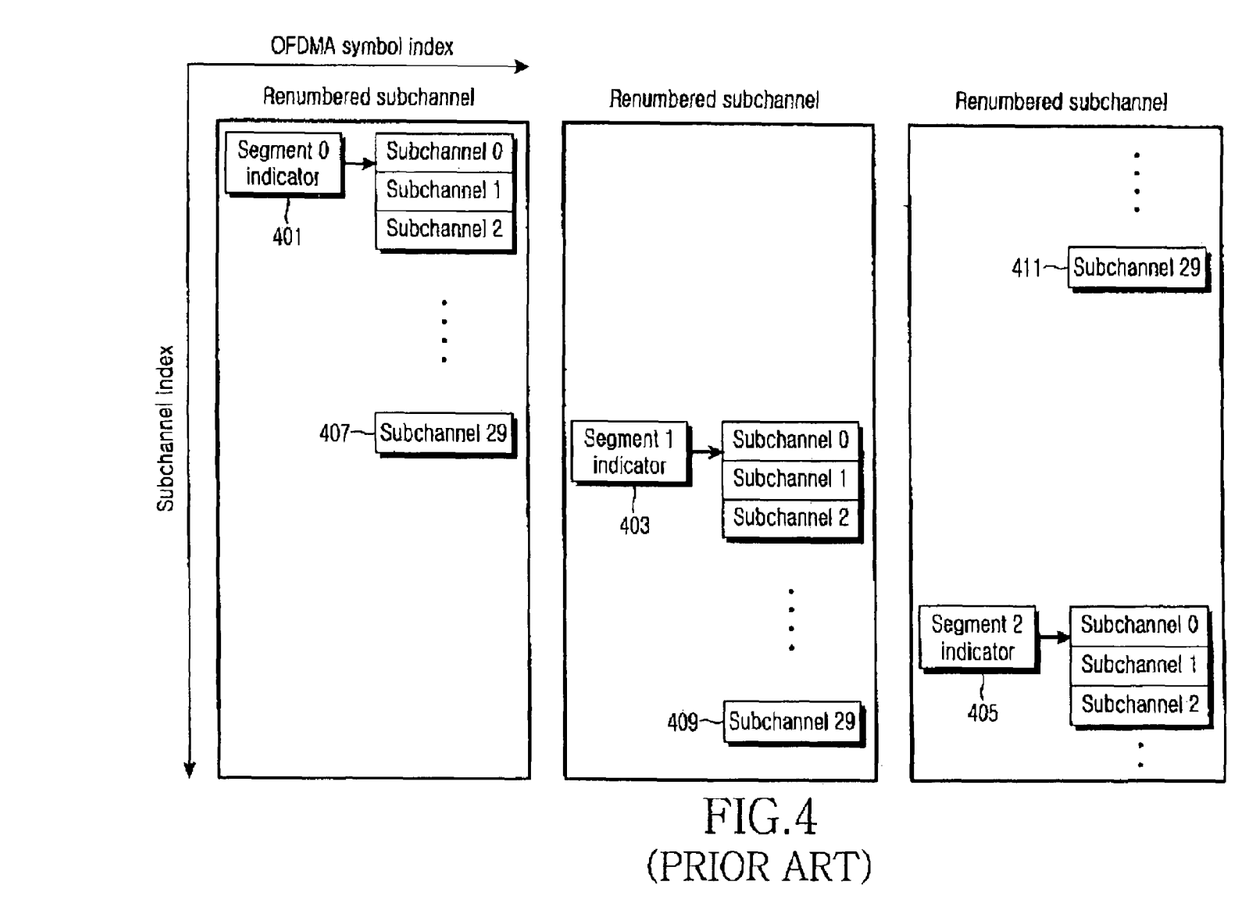
FIG. 4 is a diagram illustrating a renumbering method for an SFN service in a BWA communication system according to the prior art.

FIG. 4 is a diagram illustrating a renumbering method for an SFN service in an OFDMA communication system according to the prior art. It is assumed in FIG. 4 that 30 subchannels are allocated for the SFN service in a conventional PUSC zone. MSs perform renumbering operations 407, 409 and 411 from segment indicators 401, 403 and 405 for their associated segments. In this case, the logical subchannels are equal in order but different in physical position, making a normal SFN service impossible.

SUMMARY OF THE INVENTION

It is, therefore, an object of the present invention to provide a method and apparatus for providing a single frequency-based service in a wireless communication system.

It is another object of the present invention to provide an IE message for an SFN service in a wireless communication system.

It is further another object of the present invention to provide a method and apparatus for providing an SFN service through renumbering on a PUSC zone using a segment indicator in a wireless communication system.

According to one aspect of the present invention, there is provided a system for providing a data format-based service in a wireless communication system. The system includes a base station (BS) for setting a segment indicator with a segment indicator of a preamble for a data format representative of general data transmission, setting the segment indicator with a segment indicator indicating use of a single frequency for the data format representative of single frequency-based data transmission, and transmitting a message generated according to the data format to a mobile station (MS); and the MS for receiving a message transmitted from the BS, and performing renumbering according to a segment indicator allocated in the received message.

According to another aspect of the present invention, there is provided a transmission apparatus for providing a single frequency-based service in a wireless communication system. The apparatus includes a medium access control (MAC) message generator for generating a MAC message including a segment indicator; an encoder for encoding predetermined input information data bits and the MAC message using a predetermined coding scheme; and a subchannel generator for allocating a subchannel using the MAC message and performing renumbering on the subchannel.

According to a further aspect of the present invention, there is provided a reception apparatus for performing a single frequency-based service in a wireless communication system. The apparatus includes a subchannel extractor for use with a received signal, in performing renumbering on an actually allocated Partial Usage of SubChannels (PUSC) zone and extracting a subchannel through a reverse process corresponding to a subchannel allocation scheme used in a transmission apparatus; and a decoder for decoding the extracted subchannel into information data bits using a decoding scheme corresponding to a coding scheme used in the transmission apparatus.

According to yet another aspect of the present invention, there is provided a method for generating a message indicating a change in resource allocation scheme by a base station (BS) in a wireless communication system. The method includes determining a resource band to be allocated to a mobile station (MS); if the determined resource band is a resource band for a single-frequency network (SFN) service, setting a segment indicator field in an Space Time Coding Zone Information Element (STC_ZONE_IE) message with a pseudo random bit sequence identifier (PRBS_ID); if the determined resource band is a general resource band for a non-SFN service, setting the segment indicator field in the STC_ZONE_IE message with a segment indicator of a preamble; and transmitting, to the MS, the STC_ZONE_IE message in which the segment indicator is included according to whether the SFN service is provided.

According to still another aspect of the present invention, there is provided a processing method of a mobile station (MS) according to a resource allocation scheme in a wireless communication system. The method includes receiving an STC_ZONE_IE (Space Time Coding zone Information Element) message from a base station (BS); checking a Partial Usage of SubChannels (PUSC) zone defined in the STC_ZONE_IE message; if the PUSC zone is a first PUSC zone, using a segment indicator acquired by a preamble as a segment indicator for renumbering; if the PUSC zone is not the first PUSC zone, using a pseudo random bit sequence identifier (PRBS_ID) included in the STC_ZONE_IE message as a segment indicator; and performing renumbering according to a corresponding segment indicator.

According to still another aspect of the present invention, there is provided a method for providing a single-frequency network (SFN) service in a wireless communication system. The method includes generating, by a Base Station (BS), a pseudo random bit sequence identifier (PRBS_ID) in an Space Time Coding Zone Information Element (STC_ZONE_IE) message as a segment indicator field and transmitting the STC_ZONE_IE message to a mobile station (MS), when the BS performs the SFN service with the MS; and receiving, by the MS, the STC_ZONE_IE message from the BS, and performing renumbering for the SFN service using the PRBS_ID defined in the STC_ZONE_IE message as a segment indicator.

According to still another aspect of the present invention, there is provided a method for providing a data service between a base station (BS) and a mobile station (MS) in a wireless communication system. The method includes setting, by the BS, a first segment indicator in a medium access control (MAC) message field before transmission, if a resource allocation scheme corresponds to general data transmission; setting, by the BS, a second segment indicator in the MAC message before transmission, if the resource allocation scheme corresponds to single frequency-based data transmission; and receiving, by the MS, the MAC message from the BS, and performing renumbering according to the first segment indicator or the second segment indicator included in the received MAC message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Several exemplary embodiments of the present invention will now be described in detail with reference to the annexed drawings. In the following description, a detailed description of known functions and configurations incorporated herein has been omitted for clarity and conciseness.

The present invention provides a method and apparatus for providing a single frequency-based service in a Broadband Wireless Access (BWA) communication system, for example, an Institute of Electrical and Electronics Engineers (IEEE) 802.16 communication system.

A system using multiple frequencies, for example, a multi-frequency network (MFN), requires many frequencies to provide a broadcast service. Therefore, the BWA communication system, especially an Orthogonal Frequency Division Multiplexing (OFDM) system, requires a single-frequency network (SFN) that allows neighboring base stations (BSs) to use the same transmission frequency. In the SFN, the neighboring BSs transmits the same data over the same subchannel to acquire a transmit diversity effect, thus guaranteeing high reception performance.

Commonly, services provided in the SFN can be accomplished through a zone defined by a Space Time Coding (STC) zone Information Element (IE) (STC_ZONE_IE) after a Partial Usage of Subchannels (PUSC) zone.

However, in a renumbering process, a Mobile Station (MS) or Subscriber Station (SS) mapped to its associated segment decodes the subchannels allocated such that they are logically identical to each other but physically different from each other. In this case, therefore, the MS or SS cannot support a single frequency-based service, for example, a service by the SFN (hereinafter referred to as an "SFN service").

Therefore, the present invention uses a Pseudo Random Bit Sequence_Identifier (PRBS_ID) newly defined in an STC_ZONE_IE as a segment indicator (or segment number) for a PUSC zone defined by the STC_ZONE_IE in a DL-MAP. That is, the present invention uses the PRBS_ID in the STC_ZONE_IE, proposed in the present invention, instead of the existing segment indicator of a preamble, as a segment indicator to be applied for PUSC subchannel renumbering on a PUSC zone. In this manner, the present invention sets the same segment indicator during an SFN service, thereby making the SFN service possible.

In addition, the present invention sets the same PRBS_ID in all cells or sectors for an SFN operation. It is assumed herein that the cells are equivalent to the sectors. If, however, the sectors are subordinate to the cells, the present invention sets the same PRBS_ID in all the cells and the sectors for an SFN operation. Herein, the present invention will be described on the assumption that the cells are equivalent to the sectors. However, the present invention is not limited to this, but can be applied to all possible cases including the foregoing case where the sectors are subordinate to the cells.

Commonly, in a wireless communication system, a segmentation concept-based technique includes a renumbering scheme for a PUSC zone and a permutation sequence generation scheme for modulation selection. The present invention defines the PRBS_ID in an STC_ZONE_IE message, as a field to be used for the two segmentation concept-based techniques. A format of the STC_ZONE_IE message according to the present invention is shown in Table 2.

TABLE 2

| Syntax | Size | Notes |
|---|---|---|
| STC_ZONE_IE0 { | | |
| Extended DIUC | 4 bits | STC/ZONE_SWITCH=0x01 |
| Length | 4 bits | Length = 0x04 |
| OFDMA symbol offset | 8 bits | Denotes the start of the zone (counting from frame preamble and starting from 0) |
| Permutation | 2 bits | 0b00=PUSC permutation<br>0b01=FUSC permutation<br>0b10=Optional FUSC permutation<br>0b11=Adjacent subcarrier permutation |
| Use All SC Indicator | 1 bits | 0=Do not use all subchannels<br>1=Use all subchannels |
| STC | 2 bits | 0b00=No STC<br>0b01=STC using 2 antennas<br>0b10=STC using 4 antennas<br>0b11=FHDC using 2 antennas |
| Matrix Indicator | 2 bits | Antenna STC/FHDC matrix (see 8.4.8)<br>0b00=Matrix A<br>0b01=Matrix B<br>0b10=Matrix C (applicable to 4 antennas only)<br>0b11=Reserved |
| DL_PermBase | 5 bits | |
| PRBS ID | 2 bits | Refer to 8.4.9.4.1 |
| AMC type | 2 bits | Indicates the AMC type in case permutation type = 0b11, otherwise shall be set to 0<br>AMC type (NxM=N bins by M symbols):<br>0b00 1x6<br>0b01 2x3<br>0b10 3x2<br>0b11 reserved |
| reserved | 8 bits | Shall be set to zero |
| } | | |

As shown in Table 2, a Permutation field defines a zone to be allocated after the STC_ZONE_IE. A DL_PermBase field is used for subchannel allocation for each zone. A Use All SC indicator field indicates whether all subchannels are used in a PUSC zone, and this field is disregarded in other allocated zones. In the STC_ZONE_IE message defining a transmit diversity mode, an STC field indicates a diversity mode based on the number of antennas, and a Matrix Indicator field indicates a type of a matrix encoded using the transmit diversity. A PRBS ID field newly defined according to the present invention indicates a segment indicator for an SFN service in a PUSC zone, and the same PRBS ID is set in all cells or sectors. An AMC type field indicates a resource allocation type for an allocated AMC zone (Permutation=0b11).

A common wireless communication system uses a segment indicator of a preamble in segmentation concept-based techniques, for example, the renumbering scheme for a PUSC zone and the permutation sequence generation scheme for modulation. The present invention adds the PRBS_ID to the STC_ZONE_IE as shown in Table 2, in addition to the foregoing techniques. That is, the present invention uses a segment indicator of a preamble in a first PUSC zone, and uses the PRBS_ID defined in the present invention as a segment indicator in a subsequent zone defined by the STC_ZONE_IE, thereby providing a flexible service.

For example, for PUSC renumbering, an MS uses a segment indicator obtained from a preamble only in the first PUSC zone, and uses a PRBS_ID of a received STC_ZONE_IE message as a segment indicator in a PUSC zone defined by the STC_ZONE_IE message.

Preferably, the present invention sets the same PRBS_ID used as a segment indicator, in all cells or sectors, for the SFN service in the PUSC zone defined by the STC_ZONE_IE. For the non-SFN service, it is preferable to set the PRBS_ID with a segment indicator (or segment number) of a preamble, or randomly set the PRBS_ID.

That is, in the present invention, for the SFN service, indicators of all segments are equal to each other through the PRBS_ID in the PUSC zone defined by the STC_ZONE_IE, thereby solving the physical bandwidth mismatch problem.

Figure 5:
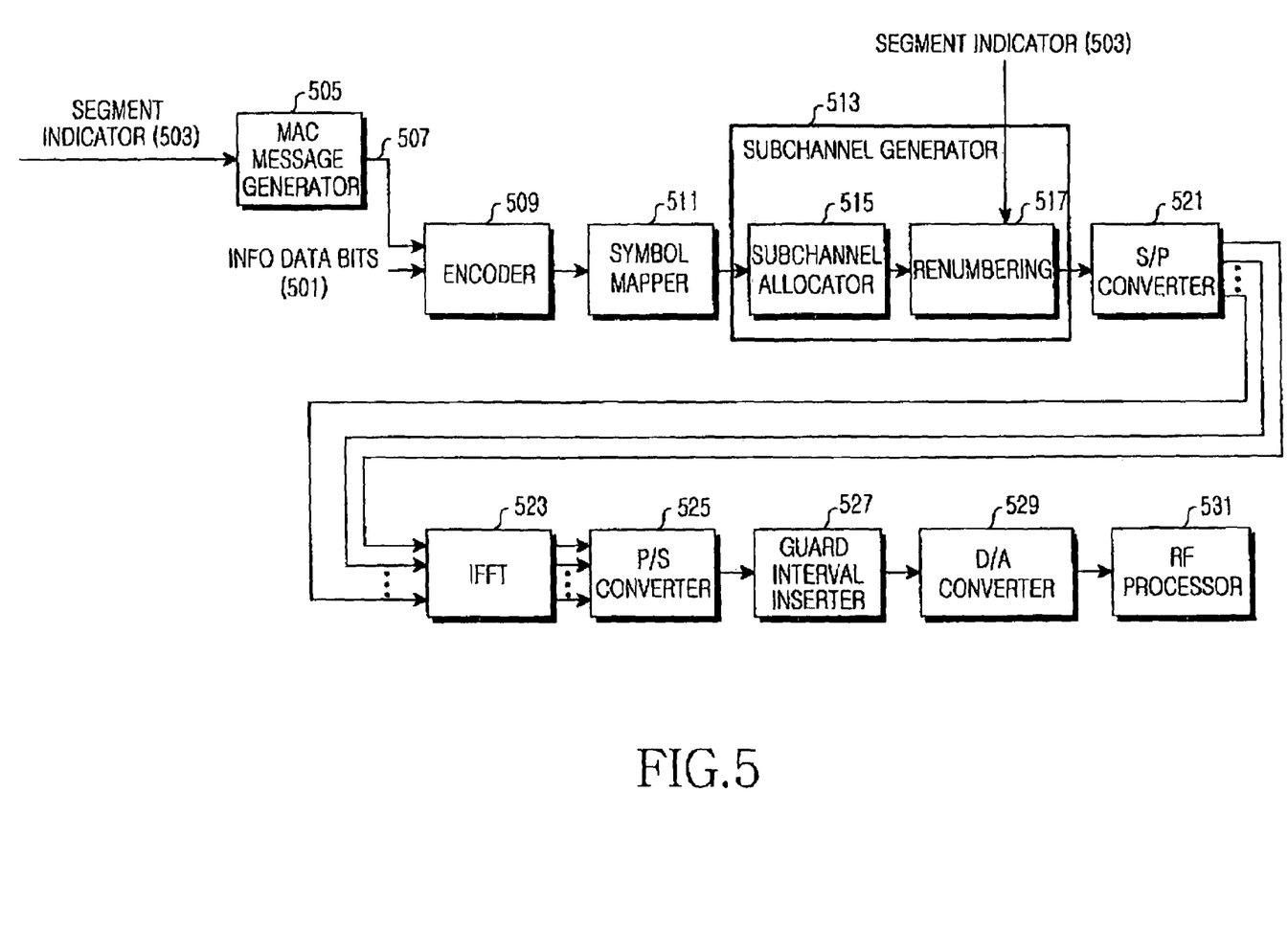
FIG. 5 is a block diagram schematically illustrating a structure of a transmission apparatus in a BWA communication system according to an embodiment of the present invention.

FIG. 5 is a block diagram schematically illustrating a structure of a transmission apparatus in a wireless communication system according to the present invention.

As illustrated in FIG. 5, a transmission apparatus according to the present invention includes a Medium Access Control (MAC) message generator 505 for generating a MAC message including a segment indicator; an encoder 509 for encoding a MAC message output from the MAC message generator 505, encoding a specific data signal, for example, information data bits, and/or encoding a combination thereof; a symbol mapper 511 for generating a modulation symbol stream in the signal coded by the encoder 509; a subchannel generator 513 for generating a subchannel in the modulated symbol stream output from the symbol mapper 511; a serial-to-parallel (S/P) converter 521 for converting the serial signal output from the subchannel generator 513 into a parallel signal; an Inverse Fast Fourier Transform (IFFT) unit 523 for performing IFFT on the parallel signal output from the S/P converter 521; a parallel-to-serial (P/S) converter 525 for converting the signal IFFT-processed by the IFFT unit 523 into a serial signal; a guard interval inserter 527 for inserting a guard interval, or a cyclic prefix (CP), used for removing interference noise from the serial signal output from the P/S converter 525; a digital-to-analog (D/A) converter 529 for converting the signal noise, removed by the guard interval inserter 527, into an analog signal; and a radio frequency (RF) processor 531 for RF-processing the analog signal output from the D/A converter 529 before transmission.

Transmission information data bits 501, such as user data bits and control data bits, and an output of the MAC message generator 505 are input to the encoder 509. Preferably, the MAC message refers to an STC_ZONE_IE message shown in Table 2, used for providing an SFN service according to the present invention. The MAC message generator 505 sets the PRBS_ID with a segment indicator 503 in generating the MAC message. Preferably, the PRBS_ID has the same value in all cells or sectors, for the SFN service.

The encoder 509 encodes the input information data bits 501 and a MAC message 507 output from the MAC message generator 505 using a predetermined coding scheme, and outputs the encoding result to the symbol mapper 511. Herein, the coding scheme can include a turbo coding scheme or a convolutional coding scheme having a predetermined coding rate.

The symbol mapper 511 modulates the coded bits output from the encoder 509 into a modulation symbol using a predetermined modulation scheme, and outputs the modulation symbol to the subchannel generator 513. Herein, the modulation scheme can include a Quadrature Phase Shift Keying (QPSK) scheme, a Quadrature Amplitude Modulation (QAM) scheme and a 16QAM scheme.

The subchannel generator 513 includes a subchannel allocator 515 for allocating a subchannel to the modulation symbols output from the symbol mapper 511, and a renumbering unit 517 for performing renumbering on the subchannel. In the subchannel generator 513, the subchannel allocator 515 allocates a subchannel according to a PUSC subchannel allocation scheme, and the renumbering unit 517 performs renumbering on the subchannel and outputs the renumbering result to the S/P converter 521. Preferably, after allocating the subchannel according to the PUSC subchannel allocation scheme, the subchannel generator 513 uses the segment indicator 503 received from an upper layer to perform the renumbering.

The S/P converter 521 converts the PUSC subchannels generated by the subchannel generator 513 into parallel modulation symbols, and outputs the parallel modulation symbols to the IFFT unit 523. The IFFT unit 523 performs N-point IFFT on the parallel modulation symbols output from the S/P converter 521, and outputs the IFFT processing result to the P/S converter 525. The P/S converter 525 converts the parallel output signal of the IFFT unit 523 into a serial signal, and outputs the serial signal to the guard interval inserter 527.

The guard interval inserter 527 inserts a guard interval signal into the output signal of the P/S converter 525, and outputs the guard interval-inserted signal to the D/A converter 529. Herein, the guard interval is inserted to remove interference between an OFDM symbol transmitted at a previous OFDM symbol time and the current OFDM symbol transmitted at the current OFDM symbol time in the OFDMA communication system.

The guard interval is provided by inserting null data for a predetermined interval. In the method of transmitting null data in the guard interval, if a receiver misestimates a start point of an OFDM symbol, interference occurs between subcarriers, increasing a misjudgment rate for a received OFDM symbol. Therefore, one of a Cyclic Prefix scheme for copying a predetermined number of last samples of a time-domain OFDM symbol and inserting the copied samples into an effective OFDM symbol, and a Cyclic Postfix scheme for copying a predetermined number of first samples of a time-domain OFDM symbol and inserting the copied samples into an effective OFDM symbol can be used for the guard interval inserter 527.

The D/A converter 529 converts the OFDM time-domain signal output from the guard interval inserter 527 into an analog signal, and outputs the analog signal to the RF processor 531. The RF processor 531, including a filter and a front-end unit, RF-processes the output signal of the D/A converter 529 such that it can be transmitted over the air, and transmits the RF-processed signal via an antenna.

Figure 6:
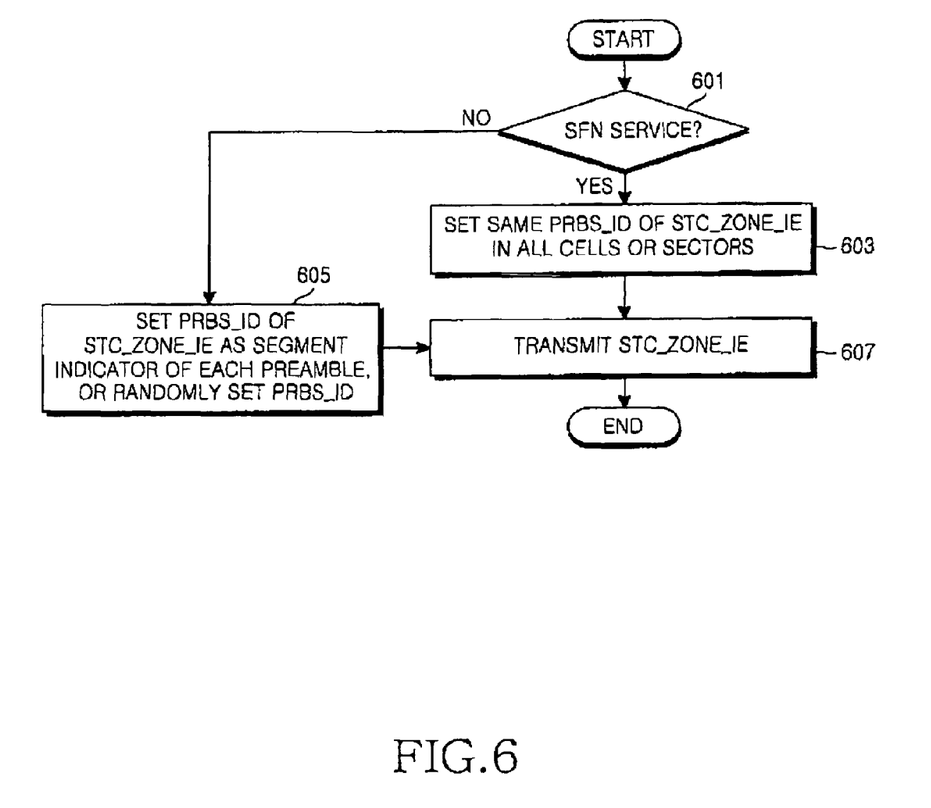
FIG. 6 is a flowchart illustrating a method for generating an STC_ZONE_IE message in a BWA communication system according to an embodiment of the present invention.

The BS apparatus for an SFN service in a wireless communication system according to the present invention has been described so far. Next, a message format and a transmission process for the SFN service in the BS apparatus will be described. FIG. 6 is a flowchart illustrating a method for generating an STC_ZONE_IE message in a wireless communication system according to the present invention.

Referring to FIG. 6, a BS apparatus according to the present invention, preferably, a MAC message generator determines in step 601 whether an allocated band is for an SFN service, in generating an STC_ZONE_IE message shown in Table 2. If it is determined that the allocated band is for the SFN service, the MAC message generator sets the same PRBS_ID in the STC_ZONE_IE with a segment indicator in all cells or sectors in step 603.

However, if it is determined that the allocated band is for normal data transmission, the MAC message generator sets the PRBS_ID in the STC_ZONE_IE with a segment indicator of a preamble, or randomly sets the PRBS_ID according to system setup, in step 605. Subsequently, the MAC message generator transmits the STC_ZONE_IE message including the set segment indicator to an MS in step 607.

As described above, the present invention sets a segment indicator of a preamble as the segment indicator in the PUSC zone where the STC_ZONE_IE is unused.

Figure 7:
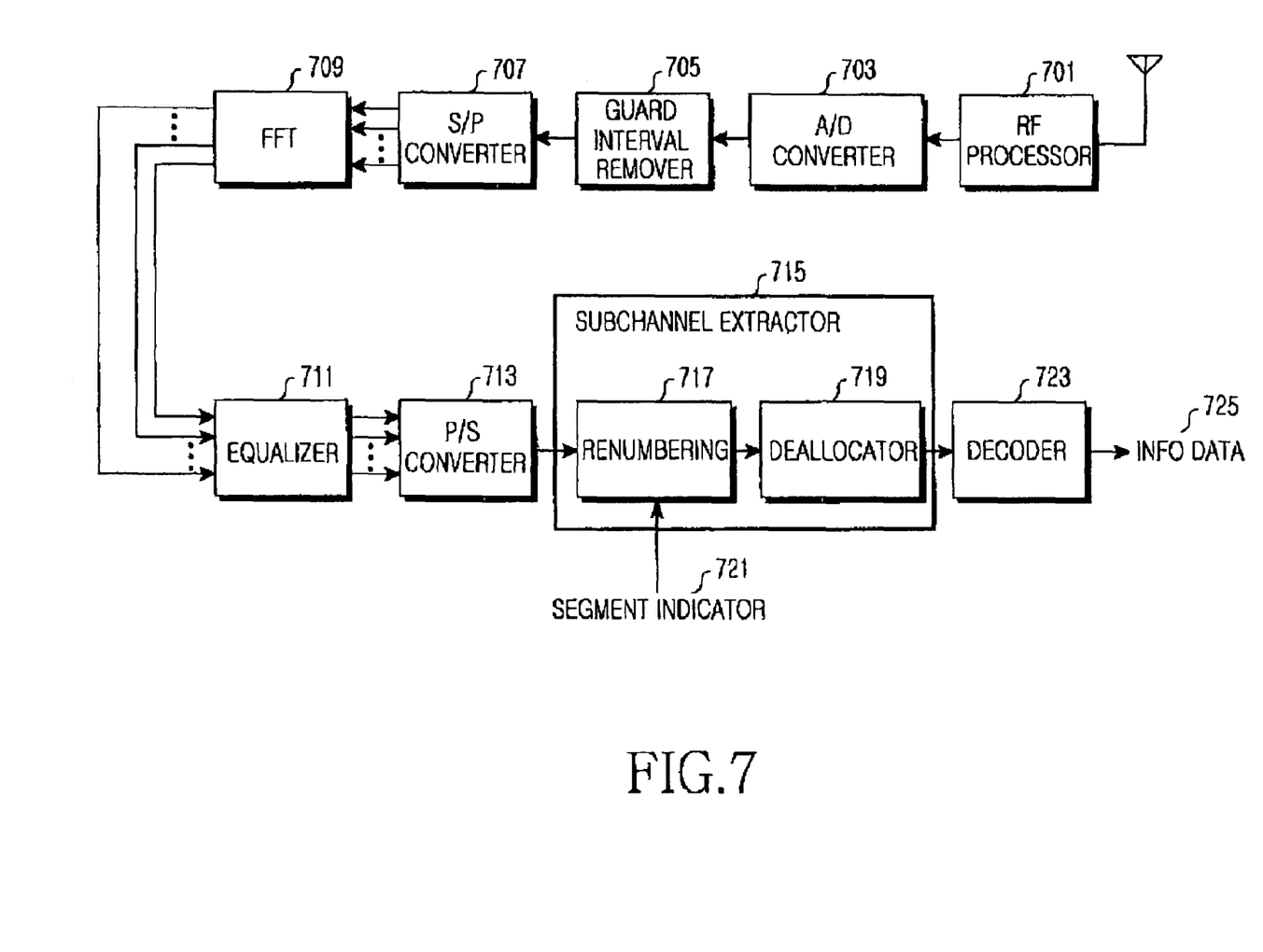
FIG. 7 is a block diagram schematically illustrating a structure of a reception apparatus in a BWA communication system according to an embodiment of the present invention.

FIG. 7 is a block diagram schematically illustrating a structure of a reception apparatus in a wireless communication system according the present invention. Specifically, FIG. 7 illustrates an exemplary reception apparatus of an MS for processing a PUSC zone defined by an STC_ZONE_IE for the SFN service.

A reception apparatus according to the present invention includes an RF processor 701, an analog-to-digital (A/D) converter 703, a guard interval remover 705, a serial-to-parallel (S/P) converter 707, a Fast Fourier Transform (FFT) unit 709, an equalizer 711, a parallel-to-serial (P/S) converter 713, a subchannel extractor 715, and a decoder 723.

Referring to FIG. 7, a signal transmitted from the transmission apparatus shown in FIG. 5 is received at a receiver of the MS via a reception antenna. The received signal has experienced a multipath channel and includes noise added thereto. The signal received through the reception antenna is input to the RF processor 701 (including a filter and a front-end unit (not shown)). The RF processor 701 down-converts the received signal into an intermediate frequency (IF) signal, and outputs the IF signal to the A/D converter 703. The A/D converter 703 converts an analog signal output from the RF processor 701 into a digital signal, and outputs the digital signal to the guard interval remover 705.

The guard interval remover 705 removes the guard interval inserted in the transmission apparatus to remove interference between OFDM symbols from the output signal of the A/D converter 703, and outputs the signal with the guard-interval removed to the S/P converter 707. The S/P converter 707 converts the serial signal output from the guard interval remover 705 into a parallel signal, and outputs the parallel signal to the FFT unit 709. The FFT unit 709 performs N-point FFT on the output signal of the S/P converter 707 to convert a time-domain signal into a frequency-domain signal, and outputs the frequency-domain signal to the equalizer 711.

The equalizer 711 compensates for distortion of the frequency-domain signal output from the FFT unit 709 through channel equalization, and outputs the compensated signal to the P/S converter 713. The P/S converter 713 converts the parallel output signal of the equalizer 711 into a serial signal, and outputs the serial signal to the subchannel extractor 715.

The subchannel extractor 715 includes a renumbering unit 717 for performing renumbering on the serial output signal of the P/S converter 713 through a reverse process of the renumbering operation performed in the transmission apparatus, and a subchannel deallocator 719 for extracting the subchannel in a PUSC zone, allocated to the MS by the transmission apparatus. In the subchannel extractor 715, the renumbering unit 717 performs renumbering on the serial output signal of the P/S converter 713 from a corresponding subchannel using a segment indicator 721 through the reverse process of the PUSC subchannel allocation scheme used in the transmission apparatus. Subsequently, the subchannel deallocator 719 extracts a subchannel and outputs the extracted subchannel to the decoder 723.

The present invention uses a PRBS_ID in an STC_ZONE_IE message as the segment indicator 721 used for renumbering in the PUSC zone defined by the STC_ZONE_IE message shown in Table 2. Preferably, for an SFN service, the present invention sets the same segment indicator or PRBS_ID for all cells or sectors.

The decoder 723 decodes the subchannel output from the subchannel extractor 715 using a decoding scheme corresponding to the coding scheme used in the transmission apparatus, and outputs the final information data bits 725. According to the present invention, when the SFN service is applied in the PUSC zone, the MS receives the same information from neighboring BSs through the same subchannel resource, so it can decode the received information in a good state.

The MS apparatus for an SFN service in a wireless communication system according to the present invention has been described so far. Next, a message reception and processing operation for an SFN service in the MS apparatus will be described.

Figure 8:
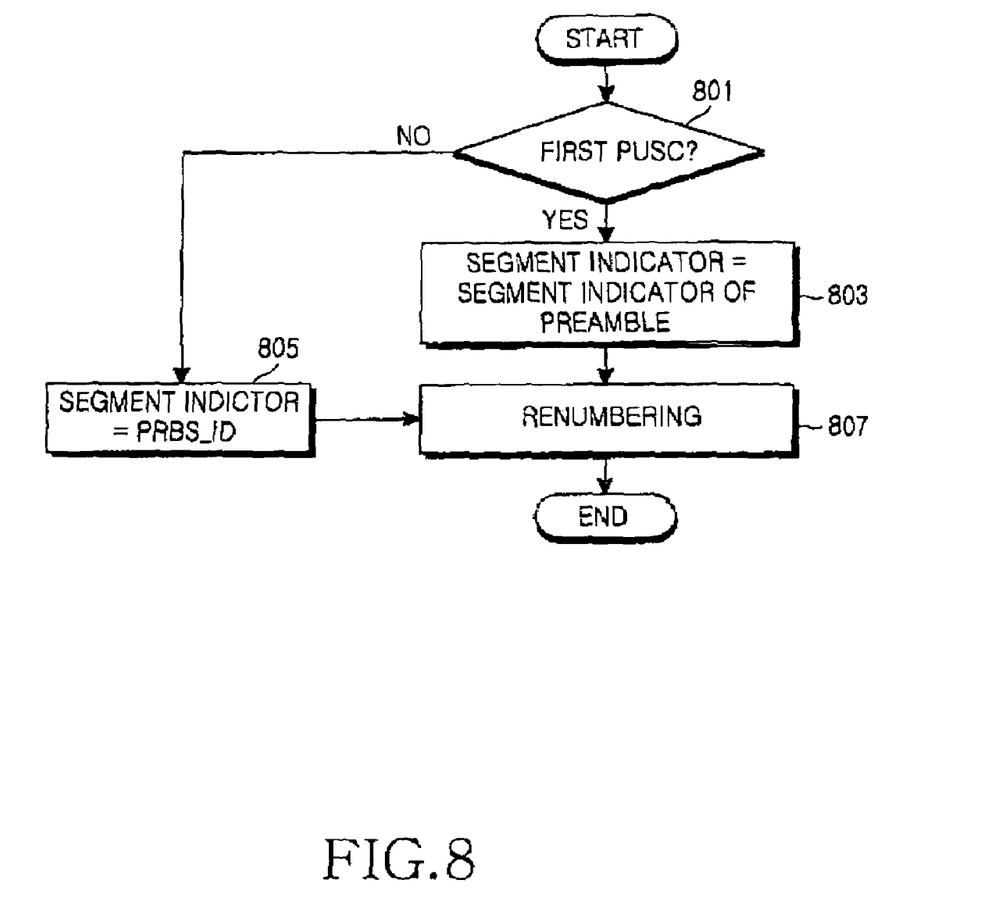
FIG. 8 is a flowchart illustrating a process of decoding a PUSC zone in a BWA communication system according to an embodiment of the present invention.

FIG. 8 is a flowchart illustrating a process of decoding a PUSC zone in a wireless communication system according to the present invention.

Referring to FIG. 8, an MS according to the present invention decodes a signal received through a downlink, and checks the decoded downlink PUSC zone in step 801. If it is determined that the decoded downlink PUSC zone is a first PUSC zone, the MS sets a segment indicator for renumbering with a segment indicator acquired by a preamble in step 803.

However, if it is determined that the decoded downlink PUSC zone is not the first PUSC zone, the MS sets a PRBS_ID received through an STC_ZONE_IE message shown in Table 2, as a segment indicator, in step 805. Subsequently, the MS performs renumbering according to the check result using the set segment indicator in step 807.

As can be understood from the foregoing description, according to the present invention, an apparatus and method for providing a single frequency-based service can provide an SFN service through a PUSC zone defined by an STC_ZONE_IE in a wireless communication system. In addition, the novel apparatus and method can provide a high-QoS broadcast service in the wireless communication system through the SFN service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing communication between a Base Station (BS) and a Mobile Station (MS) in a Broadband Wireless Access (BWA) communication system, the method comprising:

determining, by the BS, segment indicator information for renumbering to be applied to subchannels in a Partial Usage of SubChannels (PUSC) interval, the segment indicator information being included in a Space Time Coding Zone Information Element (STC_ZONE_IE);

transmitting, by the BS, the determined segment indicator information to the MS;

receiving, by the MS, the segment indicator information transmitted from the BS; and performing, by the MS, a renumbering process on the PUSC subchannels using the received segment indicator information, wherein the segment indicator information includes a Pseudo Random Bit Sequence Identifier (PRBS_ID) indicating a single frequency network service, and wherein the PRBS_ID has a same value or a random value between BSs or sectors.

2. The method of claim 1, wherein the segment indicator information includes a preamble segment indicator.

3. A transmission apparatus for providing a single frequency-based service in a wireless communication system, the apparatus comprising:

a Medium Access Control (MAC) message generator for generating a MAC message including a segment indicator, the segment indicator being included in a Space Time Coding Zone Information Element (STC_ZONE_IE);

an encoder for encoding predetermined input information data bits and the MAC message using a predetermined coding scheme; and a subchannel generator for allocating a subchannel using the MAC message and performing renumbering on the subchannel, wherein the MAC message generator sets the segment indicator with a segment indicator of a preamble in a first Partial Usage of SubChannels (PUSC) zone of a downlink, and sets a pseudo random bit sequence identifier (PRBS_ID) as the segment indicator in a PUSC zone other than the first PUSC zone, defined by an Space Time Coding Zone Information Element (STC_ZONE_IE).

4. The transmission apparatus of claim 3, wherein the subchannel generator comprises:

a subchannel allocator for allocating a subchannel according to a Partial Usage of SubChannels (PUSC) subchannel allocation scheme using the MAC message; and a renumbering unit for performing renumbering using a predetermined segment indicator received from an upper layer.

5. The transmission apparatus of claim 3, wherein the MAC message generator includes a segment indicator field for a Single-Frequency Network (SFN) service in a Partial Usage of SubChannels (PUSC) zone defined in a Space Time Coding Zone Information Element (STC_ZONE_IE) message indicating a change in resource allocation scheme.

6. The transmission apparatus of claim 5, wherein the segment indicator field includes a pseudo random bit sequence identifier (PRBS_ID) field at a PUSC zone.

7. The transmission apparatus of claim 5, wherein for an SFN service, the segment indicator field is set to the same value in all cells or sectors.

8. A reception apparatus for performing a single frequency-based service in a wireless communication system, the apparatus comprising:

a subchannel extractor for use on a received signal, in performing renumbering on an allocated Partial Usage of SubChannels (PUSC) zone and extracting a subchannel through a reverse process corresponding to a subchannel allocation scheme used in a transmission apparatus; and a decoder for decoding the extracted subchannel into information data bits using a decoding scheme corresponding to a coding scheme used in the transmission apparatus, wherein the allocated PUSC zone is defined by a Space Time Coding Zone Information Element (STC_ZONE_IE) including segment indicator information, wherein the subchannel extractor performs renumbering using a pseudo random bit sequence identifier (PRBS_ID) as the segment indicator, and wherein the PRBS_ID is used for renumbering in a PUSC zone defined in an Space Time Coding Zone Information Element (STC_ZONE_IE) message for a change in resource allocation scheme after the PUSC zone, and is set to the same value in all cells or sectors, for a Single-Frequency Network (SFN) service.

9. The reception apparatus of claim 8, wherein the subchannel extractor comprises:

a renumbering unit for performing renumbering from a corresponding subchannel through the reverse process corresponding to the subchannel allocation scheme used in the transmission apparatus, using a segment indicator; and a subchannel deallocator for extracting a subchannel in the PUSC zone by performing subchannel deallocation on the subchannel according to the subchannel allocation scheme used in the transmission apparatus.

10. A reception apparatus for performing a single frequency-based service in a wireless communication system, the apparatus comprising:

a subchannel extractor for use on a received signal, in performing renumbering on an allocated Partial Usage of SubChannels (PUSC) zone and extracting a subchannel through a reverse process corresponding to a subchannel allocation scheme used in a transmission apparatus; and a decoder for decoding the extracted subchannel into information data bits using a decoding scheme corresponding to a coding scheme used in the transmission apparatus, wherein the allocated PUSC zone is defined by a Space Time Coding Zone Information Element (STC_ZONE_IE) including segment indicator information, wherein the subchannel extractor uses a segment indicator of a preamble in a first PUSC zone, and uses a Pseudo Random Bit Sequence Identifier (PRBS_ID) as a segment indicator in a PUSC zone other than the first PUSC zone, defined by a Space Time Coding Zone Information Element (STC_ZONE_IE) message.

11. A method for providing a Single-Frequency Network (SFN) service in a wireless communication system, the method comprising the steps of:

generating, by a Base Station (BS), a Pseudo Random Bit Sequence Identifier (PRBS_ID) in a Space Time Coding Zone Information Element (STC_ZONE_IE) message as a segment indicator field and transmitting the STC_ZONE_IE message to a Mobile Station (MS), when the BS performs the SFN service with the MS; and receiving, by the MS, the STC_ZONE_IE message from the BS, and performing renumbering for the SFN service using the PRBS_ID defined in the STC_ZONE_IE message as a segment indicator.

12. The method of claim 11, wherein the PRBS_ID is set to the same value for all cells or sectors.

13. The method of claim 11, wherein the BS sets a segment indicator of a preamble in a first Partial Usage of SubChannels (PUSC) zone, and sets a PRBS_ID as a segment indicator in a PUSC zone other than the first PUSC zone, defined by the STC_ZONE_IE.

* * * * *